United States Patent

[11] 3,604,788

| [72] | Inventors | Wayne S. Paige<br>Shelton, Conn.;<br>Walter A. Mannherz, Springfield, Va. |
|---|---|---|
| [21] | Appl. No. | 680,142 |
| [22] | Filed | Nov. 2, 1967 |
| [45] | Patented | Sept. 14, 1971 |
| [73] | Assignee | The United States of America as represented by the Secretary of the Army |

[54] MICROSECOND RADIATION PULSE GENERATOR
3 Claims, 5 Drawing Figs.

[52] U.S. Cl. ................................................. 350/285,
   350/299, 356/74, 356/97, 250/105
[51] Int. Cl. ..................................................... G02f 1/34,
   G01j 3/00
[50] Field of Search ........................................... 350/285,
   289, 266, 299, 6, 274, 275; 356/123, 83, 97, 74,
   95, 94, 89, 25; 250/105

[56] References Cited
UNITED STATES PATENTS

| 2,444,560 | 7/1948 | Feldt et al. | 356/83 |
| 2,824,972 | 2/1958 | Beitz | 356/83 X |
| 3,279,308 | 10/1966 | Bartz et al. | 350/274 X |
| 3,334,238 | 8/1967 | Heimbold | 350/274 X |
| 3,409,373 | 11/1968 | Matthews | 356/80 X |
| 3,257,562 | 6/1966 | Erdman et al. | 356/95 |
| 3,399,590 | 9/1968 | Johnson et al. | 350/285 X |
| 3,458,698 | 7/1969 | Gilford et al. | 350/6 X |

OTHER REFERENCES

" VSU2 Spectrophotometer" by E. Winter et al., Jena Review, Spring Fair Issue, Rcv'd 5/65, QC 350 J4, pp. 35-36.

Strobel, Chemical Instrumentation, pg. 212.

Schmitt et al., " Double Beam Spectrophotometry in the Far Ultraviolet," 1:1150A to 3600A

*Primary Examiner*—Ronald L. Wibert
*Assistant Examiner*—T. Major
*Attorneys*—Harry M. Saragovitz, Edward J. Kelly, Herbert Berl and Robert C. Sims ABSTRACT: A microsecond radiation pulse generator for the purpose of testing radiometer type equipment. Radiation pulses having rise times better than 0.3 microseconds and pulse widths as long as 10 microseconds are provided by this generator. Its radiation covers the spectral region from 0.2 to 10 microns. Three sources of controllable radiation are provided: ultraviolet, visible, and infrared. Their radiation is chopped by a radiation chopper.

INVENTORS:
WAYNE S. PAIGE
WALTER A. MANNHERZ

MICROSECOND RADIATION PULSE GENERATOR

BACKGROUND OF THE INVENTION

Light-chopping devices using rotating mirrors to measure the lifetime of excited states or the transient response of detectors are applicable to a wide range of radiation wavelengths. The minimum achievable light-pulse width is, however, limited to several tenths of a microsecond for systems of moderate complexity. Pulse widths as small as $10^{19}$ seconds have been attained, though with a system requiring air turbine drive, shaping slit widths of 0.002 mm., and a flashlamp source with resulting limitations to duty cycle and spectral range. There still exists, therefore, a need for a simple method of generating fast pulses of light in a wide range of the spectrum. The present invention yields, for given conditions of rotary speed and slit definition, considerably narrower pulse widths.

SUMMARY OF THE INVENTION

The present invention is related to an instrument which is used to test various types of radiometer equipment. Three sources of radiation are provided, one in the ultraviolet band, one in the visible band, and one in the infrared band. These sources can be selected so as to give a radiation coverage of the spectral region from 0.3 to 10 microns. Optical elements provide the selection of the radiation source to be emitted, and a chopper is provided to chop the selected radiation to form pulses. The chopped radiation is emitted from an exit aperture located in the instrument. The size of the aperture can be adjusted to control the radiation amplitude and pulse width. The speed of the chopper motor may also be controlled. A variable-delay trigger generator is provided for synchronizing an oscilloscope of the device to be tested with the chopper rate. A variable delay is provided to allow proper synchronization of the oscilloscope regardless of chopper rate or phase shift in the radiometer being tested.

BRIEF DESCRIPTION OF THE DRAWING

The invention further resides in and is characterized by various novel features of construction, combinations, and arrangements of parts which are pointed out with particularity in the claims annexed to and forming a part of this specification. Complete understanding of the invention and an introduction to other features not specifically mentioned will be apparent to those skilled in the art to which it pertains when reference is made to the following detailed description of a specific embodiment thereof and read in conjunction with the appended drawing. The drawing, which forms a part of the specification, presents the same reference characters to represent corresponding and like parts throughout the drawing, and wherein:

DESCRIPTION OF THE PREFERRED EMBODIMENTS

Figure 1:
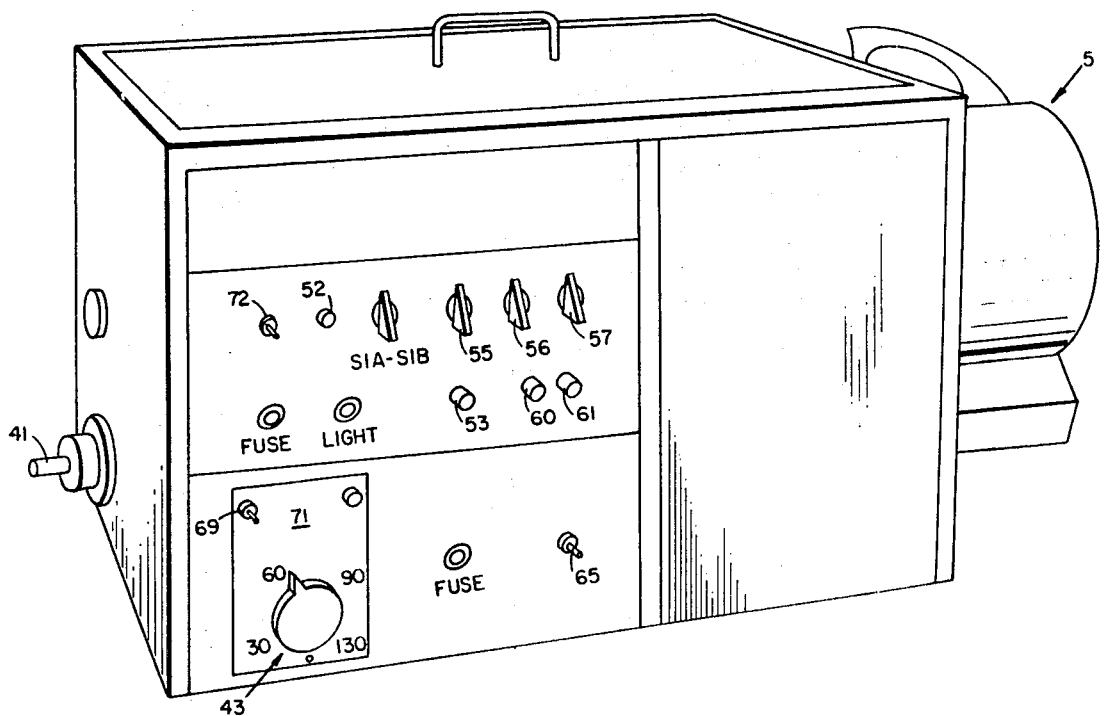
FIG. 1 shows an overall view of the main cabinet of a preferred embodiment of the invention.
Figure 2:
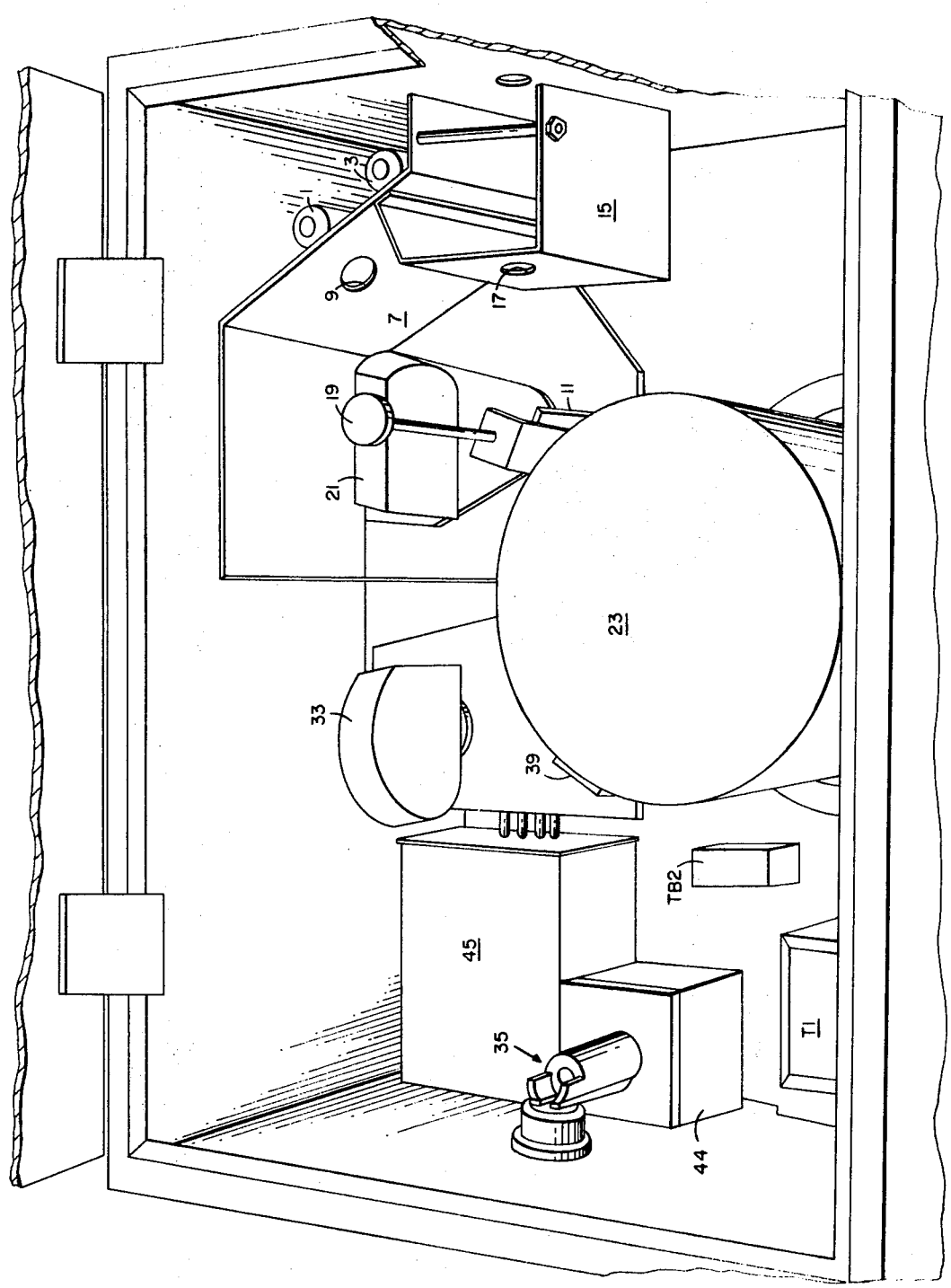
FIG. 2 illustrates the elements inside the main cabinet of the present invention.
Figure 3:
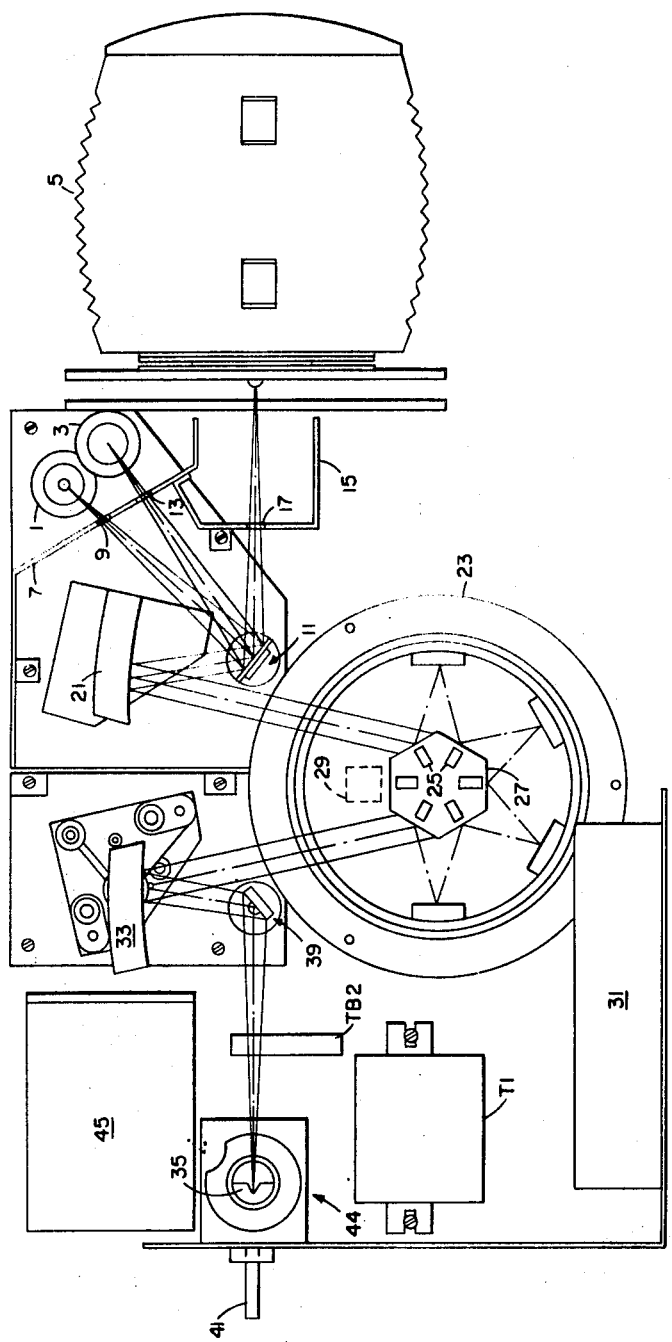
FIG. 3 is a diagrammatic representation of the preferred embodiment of the invention.

The main cabinet of the microsecond radiation pulse generator may be seen in FIG. 1. A lamp-power supply and temperature controller are mounted in a power unit in a separate cabinet. FIGS. 2 and 3 show that the main cabinet contains both ultraviolet and visible radiation sources 1 and 3 as well as all optical elements. A 1,000° C. blackbody infrared source 5 may be seen projecting to the right of the main cabinet in FIGS. 1 and 3. The case of the blackbody source is placed external to the main cabinet to reduce internal cabinet temperatures. The blackbody source has the capability of being water cooled if desired.

Ultraviolet source 1 can be an H4AB Mercury lamp of 80-watt rating. A shield 7 has an aperture 9 through which the radiation from source 1 passes to a selector mirror 11. Shield 7 also has an aperture 13 through which the visible radiation from source 3 passes to selector mirror 11. A further shield 15 is provided with an aperture 17 through which infrared radiation from source 5 passes to selector mirror 11. All of the sources are on an arc about the selector mirror below the knob 19.

The selector mirror can be rotated to three positions by means of knob 19. In each of these positions, a different radiation will be reflected onto a collimating mirror 21. Collimating mirror is a 21° off-axis paraboloidal. The collimating mirror collimates the selected radiation and reflects it into chopper 23. Chopper 23 is an "Unertl" light chopper with two modifications added thereto. One of the flat mirrors has been removed to eliminate interaction of the input and output light paths, and a plurality of magnets 25 have been imbedded in the hexagonal core 27. A magnetic pickoff device 29 is mounted to a motor mount, not shown, in such a position as to be in close proximity to the magnets as they pass by. The pickoff device is used to apply signals to trigger generator 31. In FIG. 3 the chopper is shown in its conducting position, with its cover removed. In this position the collimated energy is reflected from nine flat, front surface, mirrors and into the decollimator 33.

The decollimator mirror is also a 21° off-axis paraboloidal. Decollimator 33 forms an image of the selected source at exit slit 35, by way of mirror 39. The optical path length from sources 1, 3, and 5 to collimator 21 is made equal to the optical path length from decollimator 33 to the image of the selected source at exit slit 35 to give the optical system a magnification of one.

Due to the long optical path length through the chopper, and to the size of the hexagonal mirror surfaces, it is not possible to display a wide image at the exit slit. It is, therefore, not possible to display a wide image at the exit slit. It is, therefore, not possible to obtain both a fast rise time and a large pulse width at the same chopper speed. At maximum chopper speed, rise times of 0.2 microseconds with a pulse width of 0.5 microseconds can be obtained. By using a narrower exit slit 35 and slower chopping speed, pulses with a rise time of 2 microseconds and a pulse width of 10 microseconds can be obtained. These are not limits of the invention but serve to show that considerable variation in pulse width and rise time may be obtained by the adjustment of exit slit width 35 and chopper speed. An adjustment knob 41 is provided for adjustment of the exit slit width of micrometer 44, and an adjustment knob 43 is provided for adjustment of the chopper's speed and, therefore, chopping rate. The adjustment of the exit slit width controls radiation amplitude as well as pulse width. The slit width may be varied from 000 to 0.100 inches. The exit slit micrometer 44 may be a Perkin-Elmer device, part No. 098-0004.

Details of the construction and operation of chopper 23 may be found in "The Review of Scientific Instruments" Volume 28, Number 10, Oct., 1957. As stated above, the construction of the chopper has been modified; however, the principle operation is the same.

The main cabinet also contains a transformer T1 and terminal board TB2. A power source 45 such as a Sorenson QM21-71 provides power for the trigger generator 31. On the front of the main cabinet may be seen two control panels. The bottom panel controls the chopper speed and the ultraviolet lamp. The top panel contains a variable-delay trigger generator 31. The variable delay is incorporated to allow proper synchronization of the oscilloscope regardless of chopper rate or phase shift in the radiometer being tested.

Trigger generator 31 provides trigger pulses for synchronizing the radiant energy pulse output of the microsecond pulse generator with a recording oscilloscope. The trigger generator provides a positive pulse of approximately 40 volts amplitude and 3 microseconds pulse width with 0.5μ seconds rise time. A delay circuit provides a variable delay from approximately 6 microseconds to 500 microseconds. The variable delay circuit compensates for time relationship changes between radiant energy pulses and a magnetic pickup pulse which initiates the trigger pulse, when the rotational speed of the chopper is constant, above 200 r.p.m. Other features include test circuits for checking trigger generator operation with both continuous and single sweep operation and a nondelayed negative synchronized pulse for triggering an oscilloscope while displaying a delayed trigger pulse. In some cases it may be more desirable to use the normal internal synchronization circuits of the oscilloscope. The trigger generator provides pulses which have been delayed a fixed amount (as set by the operator). Therefore, if the chopper speed varies slightly, the video pulse may appear slightly displaced on the oscilloscope from the previous sweep.

Figure 4:
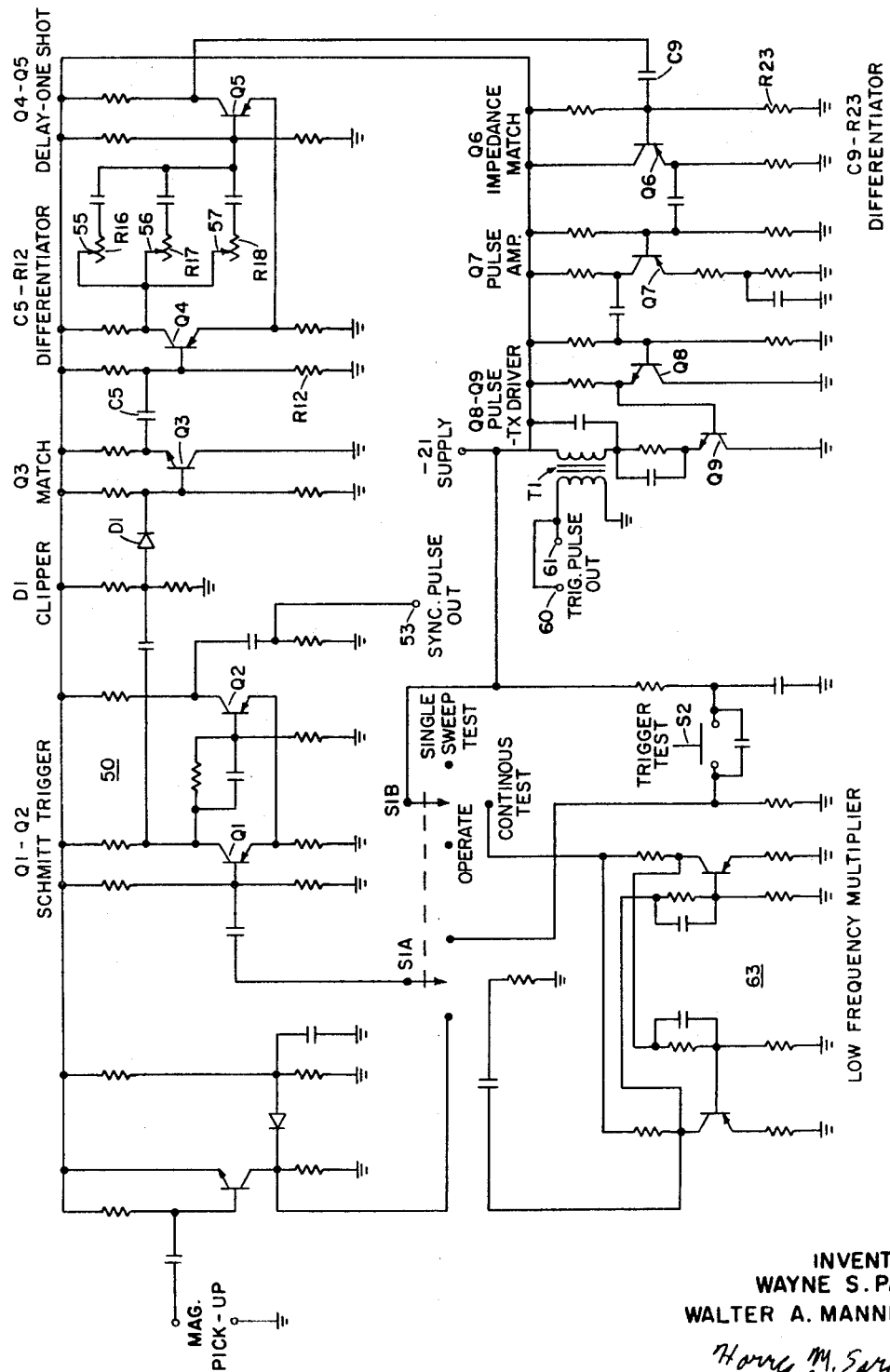
FIG. 4 is a schematic diagram of a trigger circuit used in the present invention.

FIG. 4 is a schematic diagram of trigger generator. Three inputs to the circuit are provided. The signal to be used is selected by the mode selector switch S1A–S1B. With the mode selector switch in the single sweep position, a negative pulse is initiated when the pushbutton switch S2 is pressed. The pulse is coupled by way of switch S1A to a Schmitt trigger circuit 50. The Schmitt trigger provides the nondelayed synchronized pulse 53 and another pulse which initiates the delayed trigger pulse. This pulse is differentiated with the leading edge coupled to the impedance matching stage Q3. The trailing edge is blocked by clipper D1. The differentiated pulse triggers a monostable multivibrator made up of Q4 and Q5. The pulse width of the multivibrator is varied by the settings of delay arms 55, 56, and 57 of variable resistors R16–R18. The pulse is differentiated and the lagging edge is used as the trigger pulse. An impedance match is brought about by Q6, and the pulse is amplified by Q7 and the pulse transformer T1. The trigger pulse is available at 60 and 61.

With mode selector switch S1A–S1B in the continuous test position the supply of signals comes from low-frequency multiplier 63. The outputs of the multiplier are fed to the Schmitt trigger 50 by way of switch S1A, and the rest of the circuit works the same. With the mode selector switch in the operate position the source of the signals for the Schmitt trigger comes from an output of the magnet pickoff device 29, and the rest of the circuit works the same.

Figure 5:
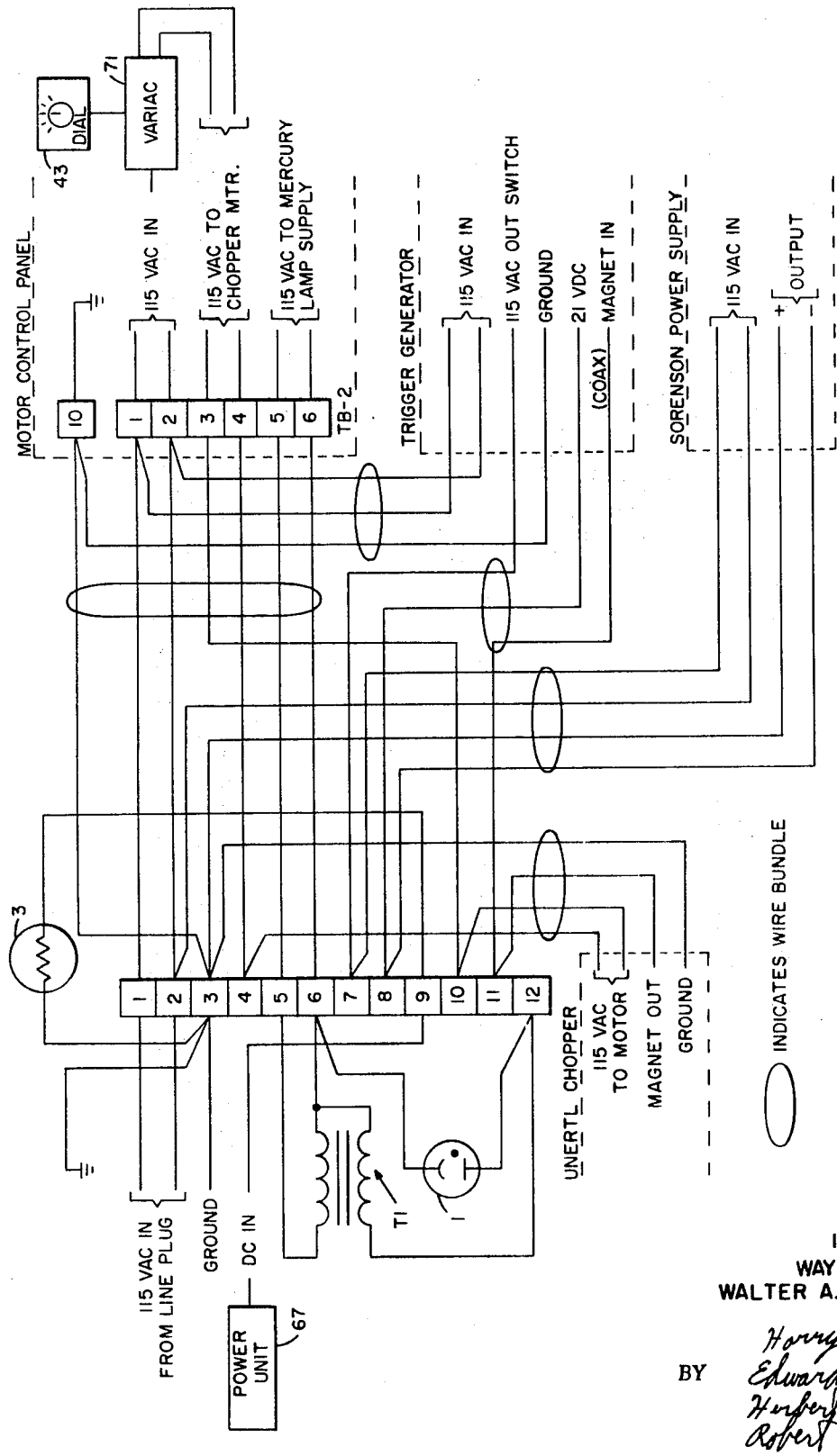
FIG. 5 is a wiring diagram of the microsecond radiation pulse generator.

The ultraviolet radiation source 1 (FIGS. 2 and 3) is activated by switch 65 located on the lower control panel shown in FIG. 1. This in turn supplies power to a transformer T1 located in the main cabinet. The electrical connections of the elements are shown in the wiring diagram of FIG. 5. The transformer supplies proper voltage to low pressure, mercury arc lamp 1. This lamp is best used for all radiometer calibration below 0.6 microns. The output of lamp 1 contains well-known line spectra from 0.2 to 0.6 microns. Line spectra may be desirable in some cases for spectral identification.

A power unit 67 is provided for furnishing power for both the infrared radiation unit 5 and the visible radiation unit. The power unit provides well regulated DC power to the incandescent lamp 3. Lamp 3 may be a 9A/T8½1 tungsten, ribbon filament lamp. The intensity of the lamp is controlled by adjustment of the voltage from power unit 67. The use of DC power for this source assures that no 60-cycle modulation will be present on the visible radiation.

The infrared radiation source 5 is a standard commercial unit. Its intensity follows the well-known "blackbody" laws. The power unit has a temperature controller which automatically maintains the source at any preset temperature between 50° and 1,000° C.

The operation of the microsecond radiation pulse generator is as follows: All the switches are turned to their OFF position. A plug for the pulse generator is inserted into an AC outlet. The cover of the main cabinet is raised and selector mirror 11 is set for the desired source. The cabinet cover is lowered and the desired source is turned ON. The desired source temperature or brightness is selected and set. The radiometer to be tested is positioned so that it is directly opposite exit slit 35 and perpendicular to it. The distance from the exit slit will depend on the particular unit being tested. The test unit should be in focus on the exit slit. Motor switch 69 is turned ON and the motor variac 71 is set at an approximate speed for the desired test. The exit slit of the micrometer 44 is turned to full open. The oscilloscope is set for internal synchronization. Final alignment of the radiometer is made to obtain the maximum electrical signal. The motor speed is once again adjusted and the exit slit width is adjusted to obtain the desired radiation pulse. The trigger generator power switch 72 is turned ON, and a shielded cable is connected from either of the pulse output jacks 60 and 61 to a trigger input jack on the oscilloscope. To set up external synchronization, the oscilloscope is set up to trigger on a positive external trigger. The delay arms 55, 56, and 57 are adjusted to obtain the desired signal on the oscilloscope.

FIG. 3 shows the microsecond radiation pulse generator conducting a pulse from the infrared source 5. The radiation from source 5 strikes selector mirror 11 and is reflected into collimating mirror 21. With the selector mirror 11 in this position, radiation from sources 1 and 3 will not be reflected into the collimating mirror 21 and, therefore, will not enter chopper 23. The radiation reflected from mirror 21 is collimated and sent into chopper 23. The chopper is shown in its conducting position. The radiation passes through the chopper to the decollimator mirror 33, and is reflected by mirror 39 to the exit slit 35 and to the device to be tested. The pickoff device 29 is at its near point to one of the magnets 25 and will send a trigger signal to one of the inputs of trigger generator 31. When the motor of the chopper turns hexagonal-shaped mirror 27 a small fraction of a degree further, chopper 23 will no longer have an output. This condition will remain until mirror 27 rotates 60° and again allows a complete path for the radiation through the chopper. This cycle is repeated until the test is completed.

A preferred embodiment of the invention has been chosen for purposes of illustration and description. The preferred embodiment illustrated is not intended to be exhaustive nor to limit the invention to the precise form disclosed. It is chose and described in order to best explain the principles of the invention and their application in practical use to thereby enable others skilled in the art to best utilize the invention in various embodiments and modifications as are best adapted to the particular use contemplated. It will be apparent to those skilled in the art that changes may be made in the form of the apparatus disclosed without departing from the spirit of the invention as set forth in the disclosure, and that in some cases certain features of the invention may sometimes be used to advantage without a corresponding use of other features. It is, therefore, to be understood that within the scope of the appended claims, the invention may be practiced otherwise than as specifically described. Accordingly, it is desired that the scope of the invention be limited only by the appended claims.

We claim:

1. A radiation pulse generator comprising a radiation source, a first reflecting means, said source being positioned to emit its radiation into said reflecting means, a radiation chopper having an input and an output positioned to receive said radiation from said reflecting means, said chopper having a series of mirrors rotatable about a common axis and a series of stationary mirrors spaced circumferentially around said rotatable mirrors for chopping said radiation entering its input into pulsed radiations which are radiated at its output, an exit aperture means having an adjustable slit width whereby the radiation amplitude and pulse width of the radiation passing through the exit aperture means can be varied, directing means positioned in the radiation pulse generator for directing the pulsed radiations to said exit aperture means, magnetic pickoff-signal-generating means associated with said chopper for providing periodic trigger signals, a trigger circuit connected to said magnetic-signal-generating means for providing trigger pulses synchronized with said chopper rate, and said chopper also having means associated therewith for producing a chopping rate which is continuously variable through a range.

2. A radiation pulse generator as set forth in claim 1, wherein said reflecting means reflects radiation to the input of the chopper by way of a collimating mirror which collimates the radiation, and said directing means consists of a decollimating mirror which receives the pulsed radiations from the chopper and reflects it to the exit aperture by way of a second reflecting means.

3. A radiation pulse generator as set forth in claim 2, the optical path lengths from each of said sources to said collimating mirror and from said decollimating mirror to said exit aperture being equal.